(12) United States Patent
Gill

(10) Patent No.: US 6,519,121 B1
(45) Date of Patent: Feb. 11, 2003

(54) SPIN VALVE SENSOR WITH COMPOSITE PINNED LAYER STRUCTURE FOR IMPROVING BIASING OF FREE LAYER STRUCTURE WITH REDUCED SENSE CURRENT SHUNTING

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/447,197

(22) Filed: Nov. 22, 1999

(51) Int. Cl.[7] .................................................. G11B 5/39
(52) U.S. Cl. .................................................. 360/324.11

(56) References Cited

U.S. PATENT DOCUMENTS 5,780,176 A * 7/1998 Iwasaki et al.
5,894,388 A * 4/1999 Sato et al.

OTHER PUBLICATIONS

Y. Hayakawa et al, High resistive nanocrystalline Fe–M–O (M=Hf, Zr, rare–earth metals) soft magnetic films for high-frequency applications (invited), *J.Appl.Phys.* 81 (8), Apr. 15, 1997.

* cited by examiner

Primary Examiner—George J. Letscher
(74) Attorney, Agent, or Firm—Ervin F. Johnston

(57) ABSTRACT

A cobalt iron hafnium oxide (CoFeHfO) layer is employed in a pinned layer structure of a top or bottom simple pinned or antiparallel (AP) pinned spin valve sensor for increasing a demagnetization field from the pinned layer structure which will improve biasing of a free layer structure in the spin valve sensor with minimal shunting of the sense current $I_S$ through the spin valve sensor because of its high resistance. The demagnetization field from the pinned layer structure opposes a typically high sense current field due to the sense current so as to zero bias the spin valve sensor with a magnetic moment of the free layer structure oriented parallel to an air bearing surface of the sensor. The cobalt iron (CoFe) content in the cobalt iron hafnium oxide (CoFeHfO) layer increases the magnetoresistance of the sense current due to its proximity to the spacer layer and the oxygen content in the layer causes specular reflection of conduction electrons through the sensor for still further increasing the magnetoresistance.

58 Claims, 11 Drawing Sheets

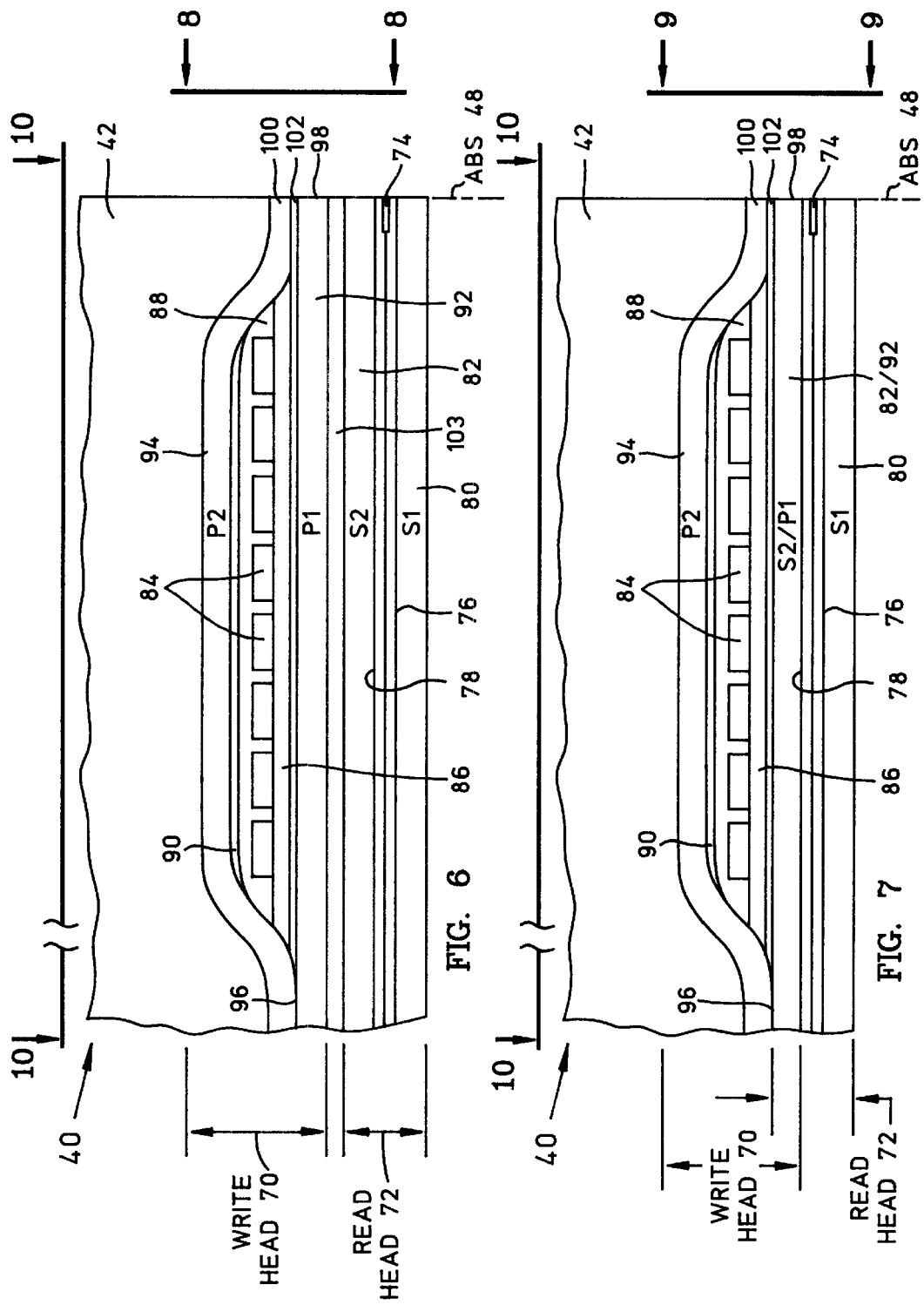

(ABS)

SPIN VALVE SENSOR WITH COMPOSITE PINNED LAYER STRUCTURE FOR IMPROVING BIASING OF FREE LAYER STRUCTURE WITH REDUCED SENSE CURRENT SHUNTING

BACKGROUND OF THE INVENTION

1. Field of the Invention

The present invention relates to a spin valve sensor with a composite pinned layer structure for improving biasing of a free layer structure with reduced sense current shunting and, more particularly, to a composite pinned layer structure which has at least one layer of cobalt iron hafnium oxide (CoFeHfO).

2. Description of the Related Art

An exemplary high performance read head employs a spin valve sensor for sensing magnetic signal fields from a moving magnetic medium, such as a rotating magnetic disk. The sensor includes a nonmagnetic electrically conductive first spacer layer sandwiched between a ferromagnetic pinned layer and a ferromagnetic free layer. A magnetic moment of the free layer is biased parallel to an air bearing surface (ABS) which is an exposed surface of the sensor that faces the rotating disk. An antiferromagnetic pinning layer interfaces the pinned layer for pinning a magnetic moment of the pinned layer 90° to the ABS. First and second leads are connected to the spin valve sensor for conducting a sense current therethrough. The magnetic moment of the free layer is free to rotate upwardly and downwardly with respect to the ABS from the parallel position in response to positive and negative magnetic signal fields from the rotating magnetic disk. The parallel position is also known as the quiescent position which is the position of the magnetic moment of the free layer when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers is minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another in response to a signal field scattering is minimal and when their magnetic moments are antiparallel in response to an opposite signal field scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of cos θ, where θ is the angle between the magnetic moments of the pinned and free layers. The sensitivity of the sensor is quantified as magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. A spin valve sensor is sometimes referred to as a giant magnetoresistive (GMR) sensor.

The transfer curve (magnetoresistive coefficient dr/R or readback signal of the spin valve head versus applied signal from the magnetic disk) of a spin valve sensor is a substantially linear portion of the aforementioned function of cos θ. The greater this angle, the greater the resistance of the spin valve to the sense current and the greater the readback signal (voltage sensed by processing circuitry). With positive and negative magnetic fields from a rotating magnetic disk (assumed to be equal in magnitude), it is important that positive and negative changes of the resistance of the spin valve read head be equal in order that the positive and negative magnitudes of the readback signals are equal. When this occurs a bias point on the transfer curve is located midway between the maximum positive and negative readback signals and is considered to be zero. With the direction of the magnetic moment of the free layer parallel to the ABS, and the direction of the magnetic moment of the pinned layer perpendicular to the ABS, the bias point is located at zero in a quiescent state of the sensor and the positive and negative readback signals will be equal when sensing positive and negative magnetic fields from the magnetic disk. The readback signals are then referred to in the art as having symmetry about the zero bias point. When the readback signals are not equal the readback signals are asymmetric.

The location of the bias point on the transfer curve is influenced by three major forces on the free layer, namely a ferromagnetic coupling field $H_F$ between the pinned layer and the free layer, a demag field $H_D$ from the pinned layer, and sense current fields $H_I$ from all conductive layers of the spin valve except the free layer. It is important that these forces position the magnetic moment of the free layer parallel to the ABS so that the bias point is located at a zero position on the transfer curve.

When the sense current $I_S$ is conducted through the spin valve sensor, the pinning layer (if conductive), the pinned layer and the first spacer layer, which are all on one side of the free layer, impose sense current fields on the free layer that rotate the magnetic moment of the free layer toward a first direction perpendicular to the ABS. The pinned layer demagnetization field $H_D$ further rotates the magnetic moment of the free layer toward the first direction counteracted by a ferromagnetic coupling field $H_F$ of the pinned layer that rotates the magnetic moment of the free layer toward a second direction antiparallel to the first direction.

Since the conductive material on the pinned layer side of the free layer is significantly greater than the conductive material on the other side of the free layer the sense current fields from the pinned layer side are a major force on the free layer which is difficult to counterbalance with the other magnetic forces acting on the free layer. Further, the conduction of the sense current $I_S$ through metallic layers of the spin valve sensor, other than the spacer layer, in effect shunts a portion of the sense current which reduces the amplitude of the signal detected by the read head. If less current is shunted through the conductive layers, other than the spacer layer, this can result in more sense current $I_S$ being conducted through the spacer layer to increase signal detection.

If the pinned layer is an antiparallel (AP) pinned layer structure instead of a single pinned layer the aforementioned problems are exacerbated. The AP pinned spin valve sensor differs from the simple spin valve sensor in that the AP pinned spin valve sensor has an AP pinned structure that has first and second AP pinned layers instead of a single pinned layer. An AP coupling layer is sandwiched between the first and second AP pinned layers. The first AP pinned layer has its magnetic moment oriented in a first direction by exchange coupling to the antiferromagnetic pinning layer.

The second AP pinned layer is immediately adjacent to the free layer and is antiferromagnetically coupled to the first AP pinned layer because of the minimal thickness (in the order of 8 Å) of the AP coupling layer between the first and second AP pinned layers. Accordingly, the magnetic moment of the second AP pinned layer is oriented in a second direction that is antiparallel to the direction of the magnetic moment of the first AP pinned layer. The magnetic moments of the first and second AP pinned layers of the AP pinned structure subtractively combine to provide a net magnetic moment that is less than the magnetic moment of the single pinned layer. The direction of the net moment is determined by the thicker of the first and second AP pinned layers. A reduced net magnetic moment equates to a reduced demagnetization (demag) field $H_D$ from the AP pinned structure. Since the exchange coupling between the pinned and pinning layers is inversely proportional to the net pinning moment a reduced net magnetic moment increases the exchange coupling between the first AP pinned layer and the pinning layer. The AP pinned spin valve sensor is described in commonly assigned U.S. Pat. No. 5,465,185 to Heim and Parkin which is incorporated by reference herein. Since an AP pinned structure has more conductive material on the pinned side of the free layer than a single pinned layer the sense current field on the free layer is increased from the pinned layer side of the free layer as compared to a single layer simple pinned spin valve sensor and it is therefore still more difficult to properly bias the free layer. Further, more of the sense current is shunted instead of being conducted through the spacer layer.

The sense current field problem is still further exacerbated in both the simple pinned and AP pinned spin valves when the pinning layer is a metallic layer, such as platinum manganese (PtMn). Accordingly, there is a strong felt need to provide an AP pinned structure as well as a single pinned layer that shunts less sense current, improves the biasing of the free layer and shunts less of the sense current.

SUMMARY OF THE INVENTION

I have provided the pinned layer structure of a spin valve sensor with at least one layer of cobalt iron hafnium oxide (CoFeHfO) for improving the biasing of the free layer structure with reduced sense current shunting. In a simple pinned layer structure, including at least first and second pinned layers, the first pinned layer is the cobalt iron hafnium oxide (CoFeHfO) layer and the second pinned layer is a cobalt based layer which interfaces the spacer layer. In the AP pinned layer structure, which includes at least first and second AP pinned layers, the first AP pinned layer is the cobalt iron hafnium oxide (CoFeHfO) layer and the second AP pinned layer is cobalt based and interfaces the spacer layer. Since the first pinned layer or the first AP pinned layer is cobalt based and interfaces the spacer layer, the magnetoresistance of the spin valve is optimized. In a preferred embodiment the cobalt based layer is cobalt iron (CoFe).

As discussed hereinabove it is desirable to decrease the field on the free layer structure due to the sense current flowing through the pinned layer structure so as to improve a counterbalancing of other magnetic fields acting on the free layer structure. In this manner a zero bias point can be achieved on the transfer curve of the read head for promoting read signal symmetry. This decrease of field is achieved by making the second pinned layer or the second AP pinned layer of cobalt iron hafnium oxide (CoFeHfO). Cobalt iron hafnium oxide (CoFeHfO) is magnetically soft and has a high moment but yet has a very high resistance, in the order of 400 $\mu$ohm/cm. Accordingly, as the sense current $I_S$ flows through the sensor, practically none of the sense current flows through the second pinned or second AP pinned layer, so that practically no contribution is made to the net sense current field on the free layer structure. Since there is minimal sense current shunting through the second layer the magnetoresistive coefficient dr/R(magnetoresistance) is improved.

Further, for a simple spin valve sensor the oxide content in the cobalt iron hafnium oxide (CoFeHfO) second layer enables the second layer to serve as a specular reflector of conduction electrons through the spin valve sensor which still further increases the magnetoresistance of the spin valve sensor. Without the specular reflection some of the conduction electrons are lost from the path through the sensor causing a loss in the magnetoresistance of the sensor. The thickness of the cobalt iron hafnium oxide (CoFeHfO) second layer can be easily designed for providing the desired demagnetization field from the pinned layer structure for completely counterbalancing other fields acting on the free layer structure. The equivalent magnetic thickness of cobalt iron hafnium oxide (CoFeHfO) is virtually the same as an equivalent thickness of a cobalt based material, such as cobalt (Co) or cobalt iron (CoFe). An equivalent thickness means the equivalent thickness to nickel iron ($Ni_{80}Fe_{20}$). An actual thickness of a cobalt or cobalt iron ($Co_{90}Fe_{10}$) layer has an equivalent magnetic thickness of about 1.7 times its actual thickness. In the preferred embodiment the first layer of cobalt iron hafnium oxide (CoFeHfO) will have a greater magnetic thickness than the second cobalt based layer in either the simple pinned layer structure or the AP pinned layer structure.

It is important that the range of the oxide content in the cobalt iron hafnium oxide (CoFeHfO) be 10% to 30%. When the oxide content falls below 10% the desired high resistance is not obtained and when the oxide content is above 30% the second layer loses its softness and high moment necessary for counterbalancing other fields on the free layer structure. Cobalt iron hafnium oxide (CoFeHfO) is highly thermally stable in that it maintains its structure, even at 400° C. This can be important since a read sensor may reach such a high temperature when it accidentally contacts an asperity on a rotating magnetic disk. The hafnium (Hf) and oxide contents of the cobalt iron hafnium oxide (CoFeHfO) give this material a nanocrystalline structure with mixed oxide and metallic phases which causes the very high resistance. As the grain size gets smaller the resistance increases. It is believed that the oxygen ($O_2$) content oxidizes slightly with the iron (Fe) and cobalt (Co) content, but mostly combines with hafnium (Hf) to form hafnium oxide (HfO). Additional descriptive material on cobalt iron hafnium oxide (CoFeHfO) is found in *Journal of Applied Physics,* Vol. 81, No. 8, Part 2, dated Apr. 15, 1997 by Y. Hayagawa. A preferred cobalt iron hafnium oxide (CoFeHfO) is $(Co_{90} Fe_{10})_{100-x}Hf_5O_{10-30}$ where x equals 15 to 35. The invention applies to either top or bottom spin valves where a top spin valve has its pinned layer structure closer to the second read gap layer and the bottom spin valve has its pinned layer structure located closer to the first read gap layer.

An object of the present invention is to provide a composite pinned layer structure wherein one of the layers is a high resistance high magnetic moment layer for decreasing a sense current field from a pinned layer structure on a free layer structure.

Another object is to provide a pinned layer structure wherein magnetoresistance of a spin valve sensor is increased by having a cobalt based first layer interfacing a spacer layer and a second layer, which has a cobalt iron (CoFe) constituent, for still further increasing magnetoresistance, and hafnium (Hf) and oxide contents for providing a high resistance for minimizing sense current shunting and the oxide content for specular reflection of conduction electrons so as to further improve the magnetoresistance.

Still another object is to provide a method of making a spin valve sensor with the aforementioned pinned layer structure in a magnetic read head or a magnetic read and write head assembly.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
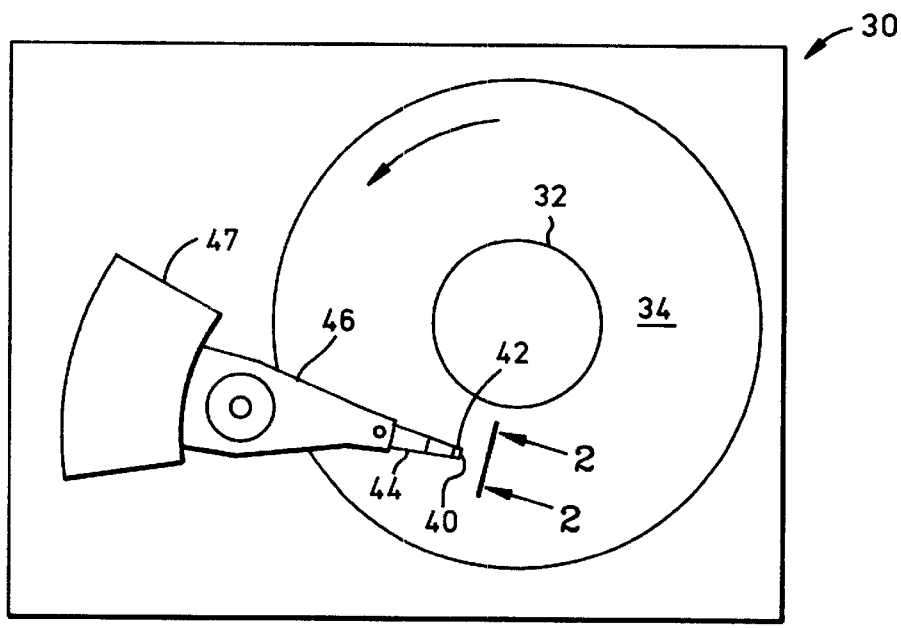
FIG. 1 is a plan view of an exemplary magnetic disk drive.
Figure 2:
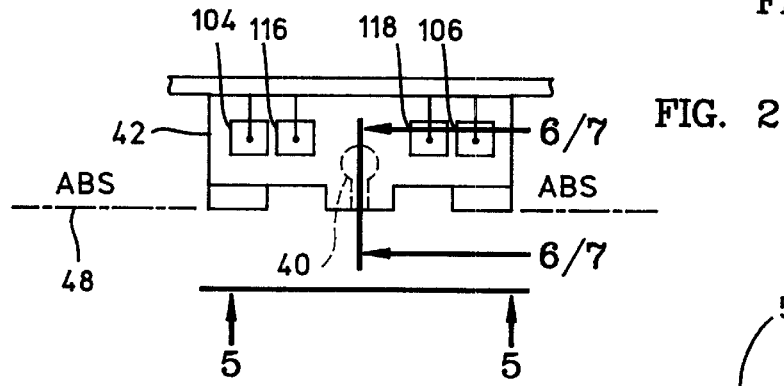
FIG. 2 is an end view of a slider with a magnetic head of the disk drive as seen in plane 2—2.
Figure 3:
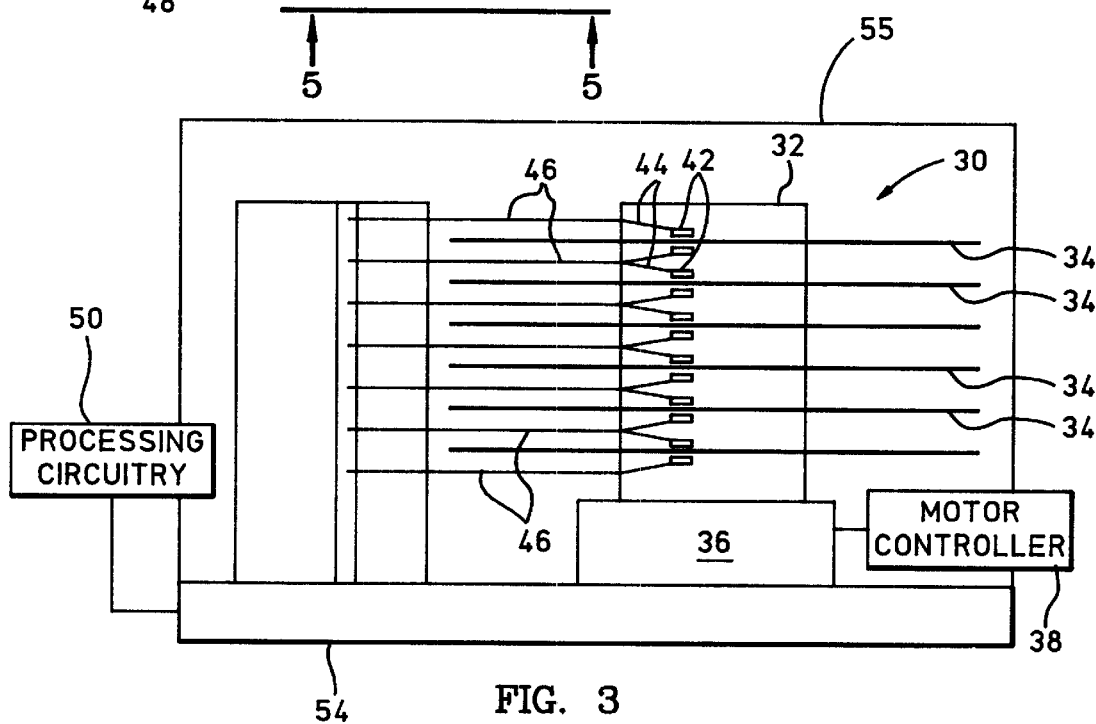
FIG. 3 is an elevation view of the magnetic disk drive wherein multiple disks and magnetic heads are employed.
Figure 4:
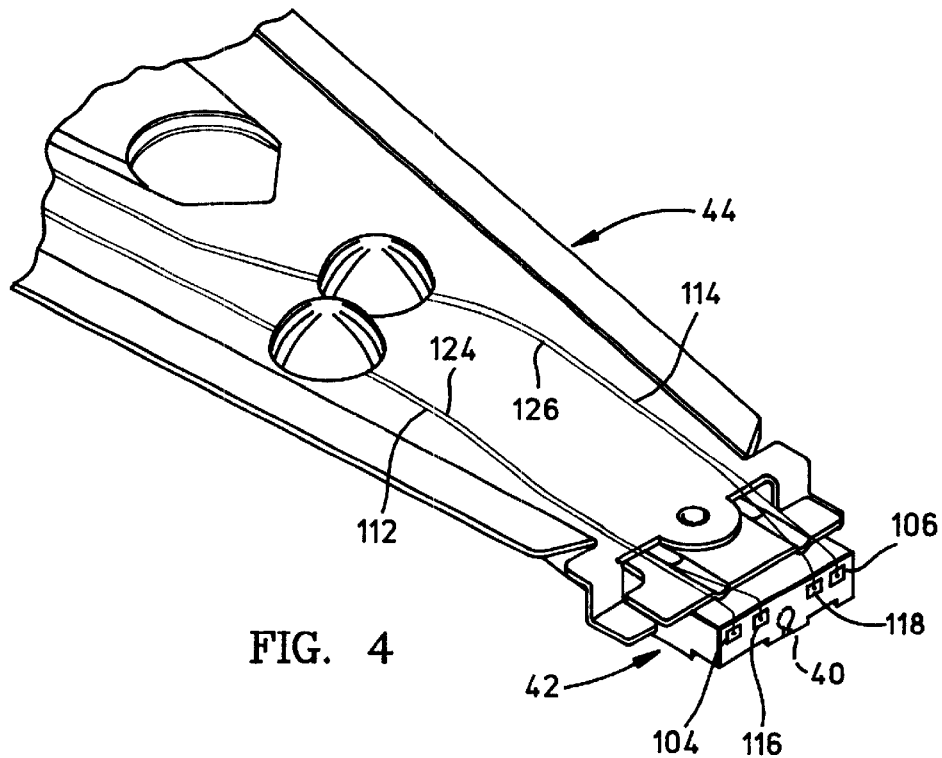
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 which is mounted on a suspension 44 that is moved by actuator arm 46. The actuator arm 46 is rotatably positioned by an actuator 47. A plurality of disks, sliders and suspensions may be employed in a large capacity direct access storage device (DASD) as shown in FIG. 3. The actuator arm 47 moves the actuator arm 46 and the suspension 44 to position the slider 42 so that the magnetic head 40 is in a transducing relationship with a surface of the magnetic disk 34. When the disk 34 is rotated by the spindle motor 36 the slider is supported on a thin (typically, 0.05 µm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks on the disk. In FIG. 4 the slider 42 is shown mounted to a suspension 44. The components described hereinabove may be mounted on a frame 54 of a housing, as shown in FIG. 3.

Figure 5:
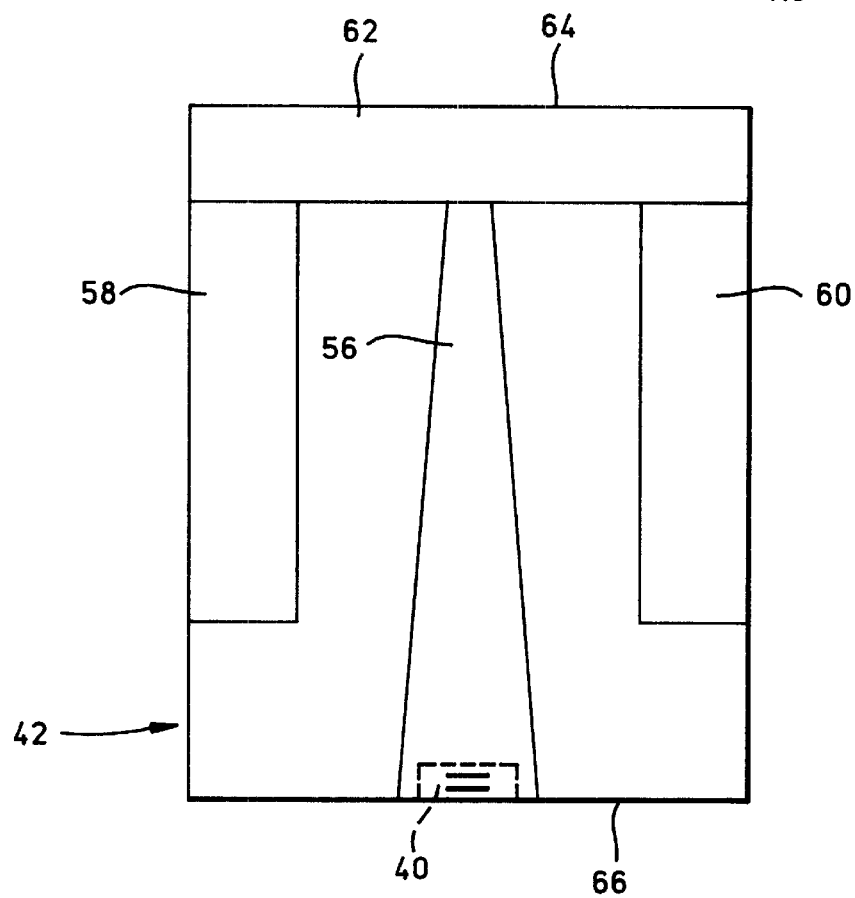
FIG. 5 is an ABS view of the magnetic head taken along plane 5—5 of FIG. 2.
Figure 10:
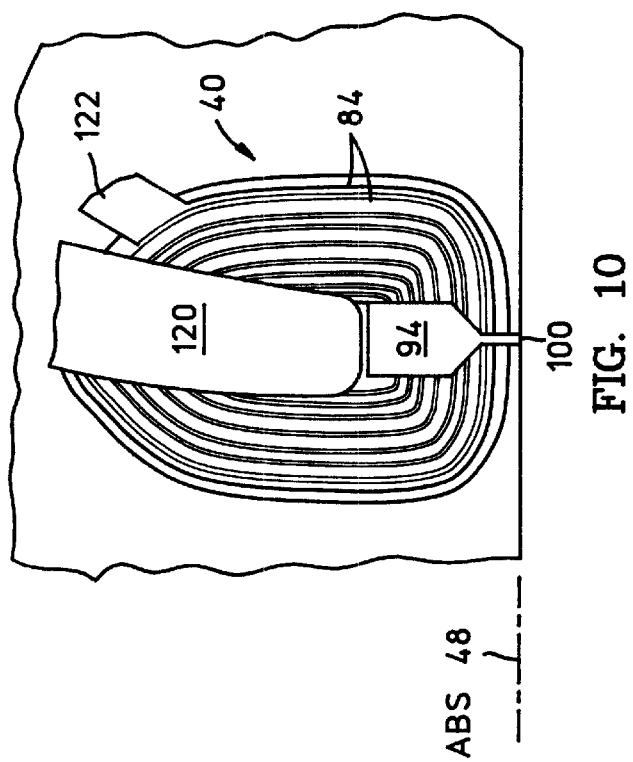
FIG. 10 is a view taken along plane 10—10 of FIGS. 6 or 7 with all material above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
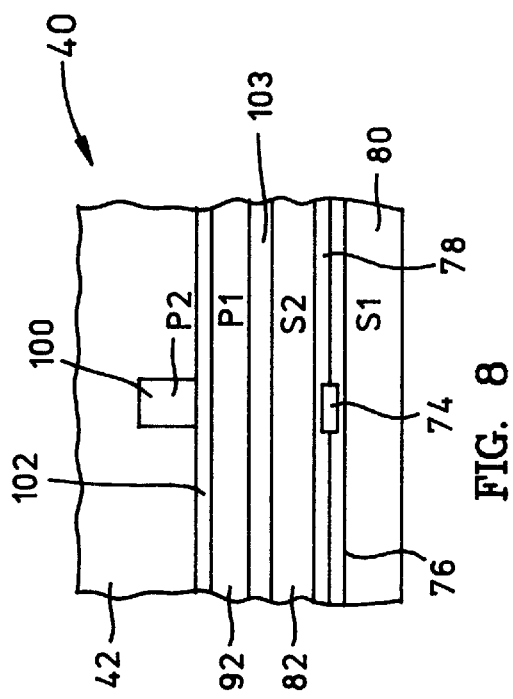
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
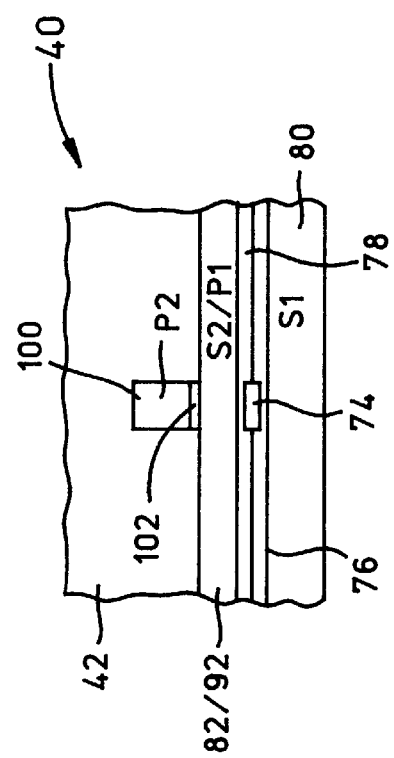
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
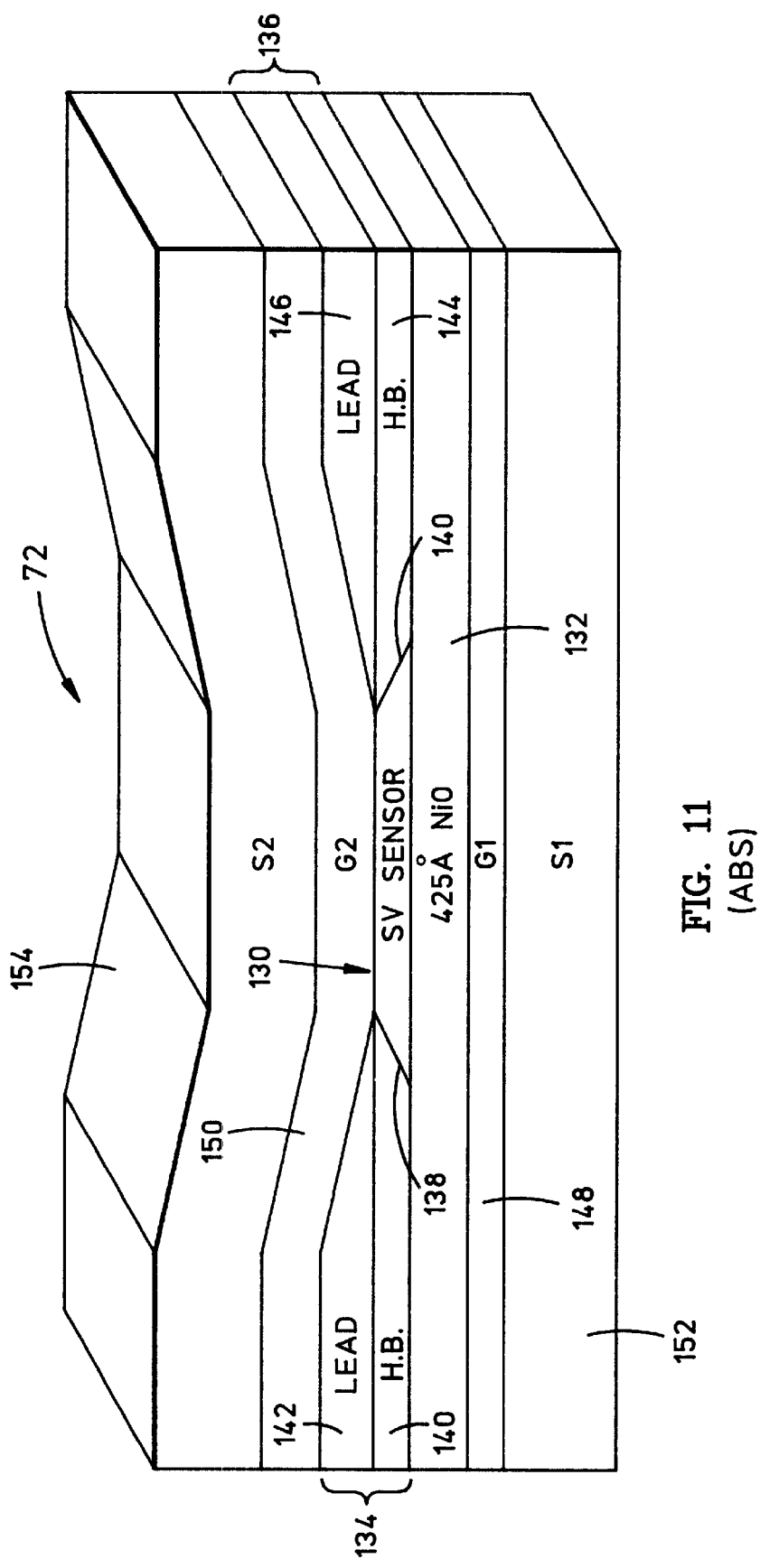
FIG. 11 is an isometric ABS illustration of a read head which employs a spin valve (SV) sensor.

FIG. 11 is an isometric ABS illustration of the read head 72 shown in FIG. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, has a magnetic moment that is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Top Simple Pinned Spin Valve

Figure 12:
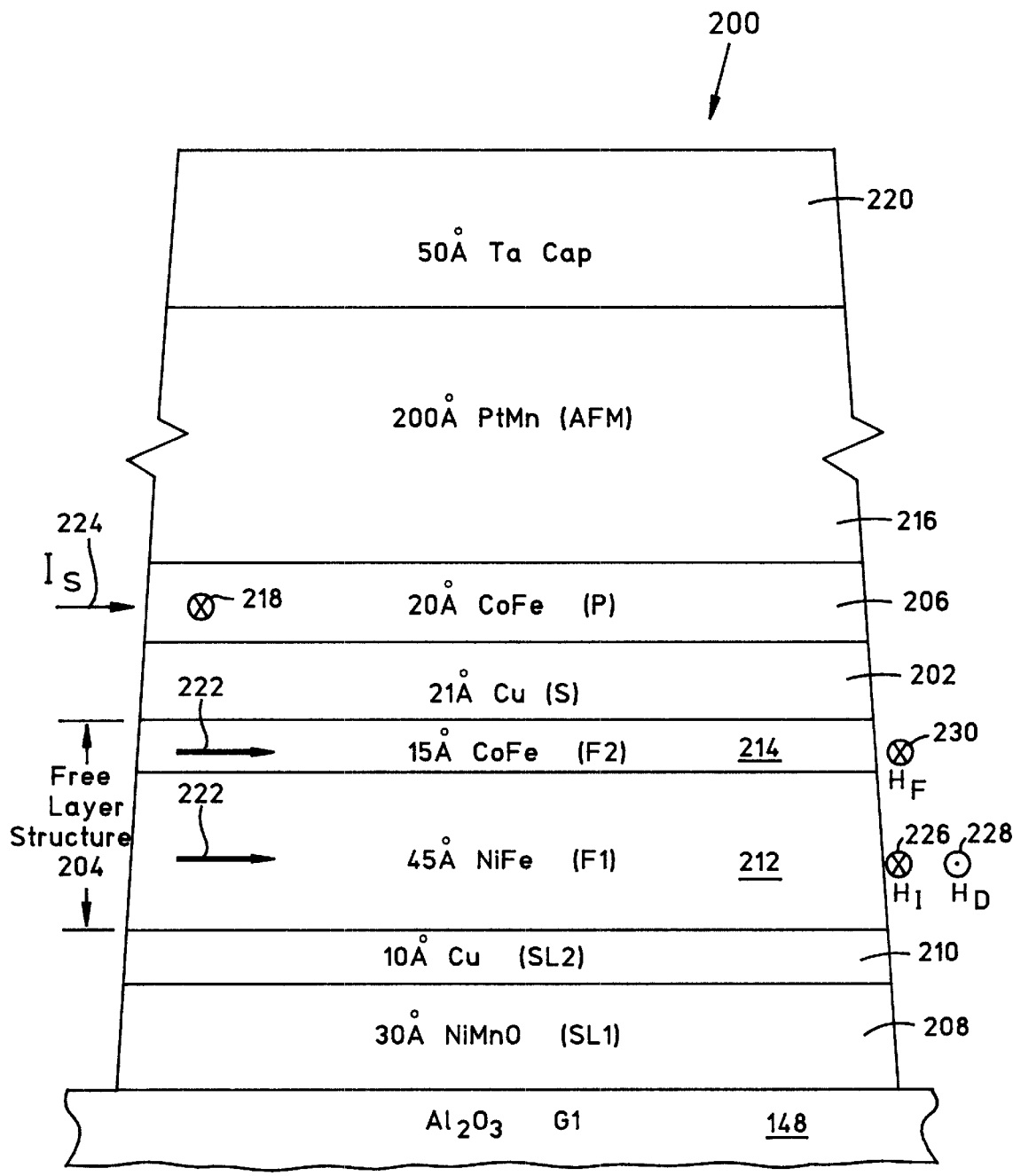
FIG. 12 is an ABS illustration of an exemplary top simple pinned spin valve sensor.

FIG. 12 shows an exemplary top simple pinned spin valve 200 which includes a nonmagnetic conductive spacer layer (S) 202 which is located between a free layer structure 204 and a pinned layer 206. Exemplary seed layers for the free layer structure 204 are a first seed layer (SL1) 208 on the first gap layer (GI) 148 of FIG. 11 and a second seed layer (SL2) on the first seed layer 208. Exemplary layers for the free layer structure 204 are a first free layer (F1) 212 on the second seed layer 210 and a second free layer (F2) 214 on the first free layer. An antiferromagnetic (AFM) pinning layer 216 interfaces and is exchange coupled to the pinned layer 206 for pinning a magnetic moment 218 of the pinned layer perpendicular to the ABS in an exemplary direction away from the ABS, as shown at 218. A cap layer 220 is on the pinning layer 216 for protecting the sensor from subsequent processing steps.

Exemplary thicknesses and materials for the layers are 30 Å of nickel manganese oxide (NiMnO) for the first seed layer 208, 10 Å of copper (Cu) for the second seed layer 210, 45 Å of nickel iron (NiFe) for the first free layer 212, 15 Å of cobalt iron (CoFe) for the second free layer 214, 21 Å of copper (Cu) for the spacer layer 202, 20 Å of cobalt iron (CoFe) for the pinned layer 206, 200 Å of platinum manganese (PtMn) for the pinning layer 216 and 50 Å of tantalum (Ta) for the cap layer 220.

The free layer structure 204 has a magnetic moment 222 which is parallel to the ABS in an exemplary direction from left to right. When a magnetic signal from a rotating magnetic disk rotates the magnetic moment 222 upwardly relative to the fixed magnetic moment 218 of the pinned layer the resistance of the spin valve sensor to the sense current $I_S$ 224 decreases and when the magnetic moment 222 is rotated toward the ABS the resistance of the spin valve sensor to the sense current $I_S$ increases. These are processed by the processing circuitry 50 in FIG. 3 as playback signals. Optionally, the directions of the magnetic moments 218 and 222 and the sense current $I_S$ 224 may be reversed.

Various magnetic fields acting on the free layer structure 204 affect the biasing of the spin valve sensor. It is desirable that the magnetic fields bias the spin valve sensor to a zero bias point on its transfer curve which means that the magnetic moment 222 of the free layer structure is parallel to the ABS as shown. It should be noted that there is more conductive material above the free layer structure 204 than there is below the free layer structure. This is especially true in a typical top simple pinned spin valve sensor where the pinning layer 216 is metal, such as platinum manganese (PtMn), iridium manganese (IrMn), nickel manganese (NiMn) or iron manganese (FeMn). Platinum manganese (PtMn) is preferred because it has a desirable blocking temperature of approximately 350° C. and is relatively thin, on the order of 200 Å, where the blocking temperature is the temperature at which all the magnetic spins of the pinning layer are free to rotate. Iridium manganese (IrMn) has a lower blocking temperature of about 250° C. to 260° C. but can be thinner, on the order of 80 Å. Iron manganese (FeMn), which will function with a thickness of about 150 Å, has a very low blocking temperature of about 160° C. Because of the increased conductive material on top of the free layer structure 204 the sense current $I_S$ 224 causes a net sense current field 226 on the free layer structure 204 which is directed perpendicular to and away from the ABS. Because of the high sense current field 226 it is important that the pinned layer 206 have its magnetic moment 218 directed away from the ABS so that the demagnetization field $H_D$ 228 from the pinned layer is antiparallel to the sense current field 226. Because of the magnetic moment 218 there is a ferromagnetic coupling field $H_F$ 230 on the free layer structure which is parallel to the sense current field 226. Accordingly, the demagnetization field 228 must completely counterbalance the sense current field 226 and the ferromagnetic coupling field 230 in order for the magnetic moment 222 to be positioned parallel to the ABS when the sensor is in a quiescent condition, namely when the sense current $I_S$ is conducted therethrough without imposition of any signal fields from a rotating magnetic disk.

The cobalt based pinned layer 206, such cobalt (Co) or cobalt iron (CoFe), optimizes the magnetoresistance of the spin valve sensor because of its interface with the copper spacer layer 202. Increasing the thickness of the cobalt based pinned layer above 20 Å to 25 Å would, from one standpoint, increase the magnetoresistance up to about 40 Å, as well as increasing the demagnetization field of the pinned layer 206. Unfortunately, an increase in the thickness of the cobalt based layer 206 beyond about 25 Å results in additional sense current shunting which opposes the increase in magnetoresistance and essentially cancels out any improvement. The same is true if a nickel iron (NiFe) layer is placed between the cobalt based pinned layer 206 and the pinning layer 216. Accordingly, there is a dilemma in obtaining a proper biasing of the free layer structure 204 without causing increased shunting of the sense current and a loss of magnetoresistance.

First Embodiment of the Present Invention

Figure 13:
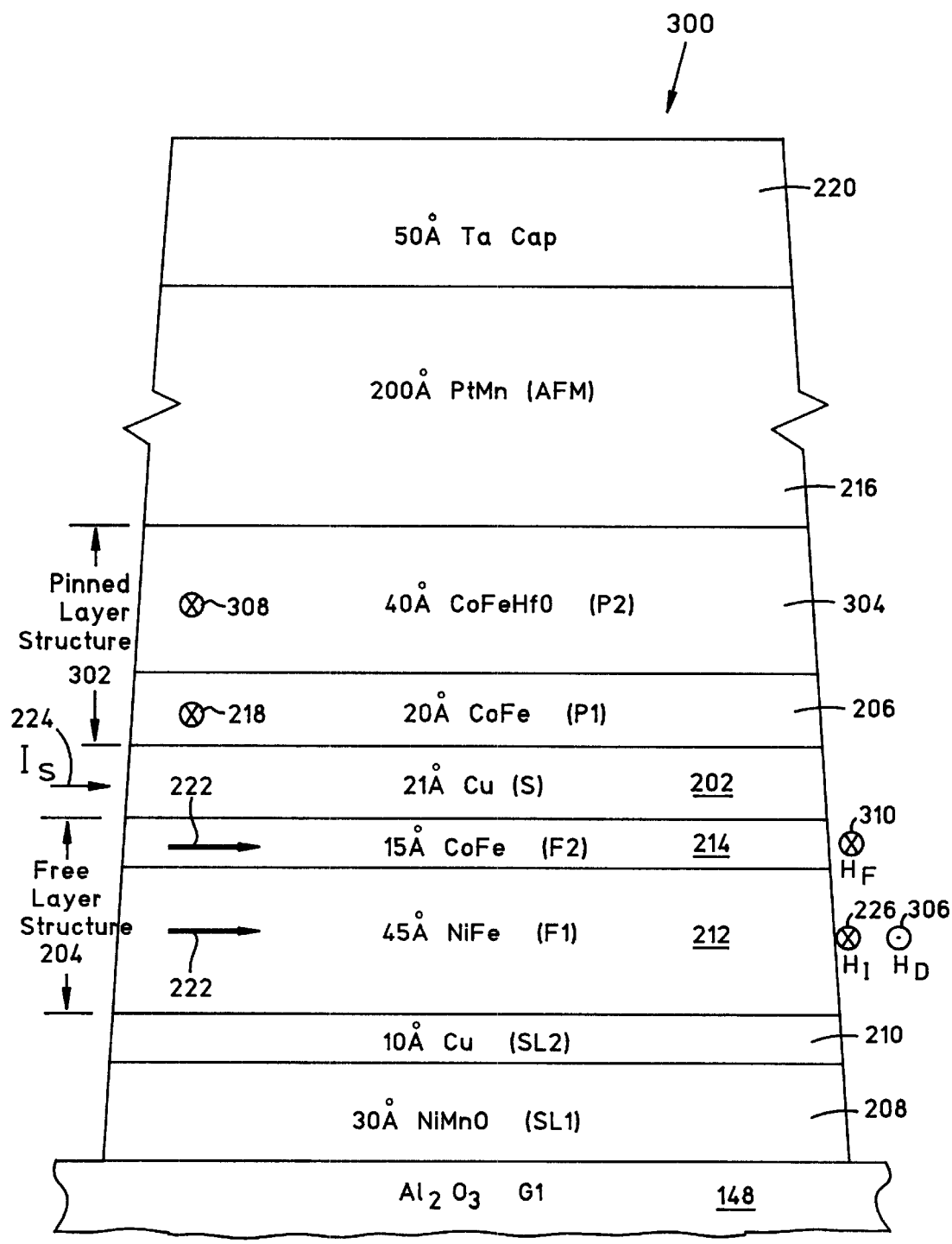
FIG. 13 is an ABS illustration of a first embodiment of the present invention.

A first embodiment 300 of the present spin valve sensor is shown in FIG. 13 which is the same as the spin valve sensor 200 shown in FIG. 12 except for a pinned layer structure 302 which includes a first pinned layer (P1) 206, which is the same as the layer 206 in FIG. 12, interfacing the copper (Cu) spacer layer 202, and a second pinned layer (P2) 304 which is cobalt iron hafnium oxide (CoFeHfO). The cobalt iron hafnium oxide (CoFeHfO) second pinned layer 304 contributes to the net demagnetization field $H_D$ 306 from the pinned layer structure 302, which is antiparallel to the sense current field 226, with minimal additional shunting of the sense current $I_S$ 224 because of the high resistance of additional layer 304. The magnetic moment 308 of the second pinned layer 304 is in the same direction as the magnetic moment 218 of the first pinned layer 206. The pinned layer structure 302 causes a ferromagnetic coupling field $H_F$ 310 which is slightly higher than the ferromagnetic coupling field 230 in FIG. 12. For a same actual thickness the cobalt iron hafnium oxide (CoFeHfO) pinned layer 304 would have about the same magnetic moment as the cobalt based pinned layer 206. However, in order to sufficiently counterbalance the sense current and ferromagnetic coupling fields 226 and 310 the second pinned layer 304 is thicker than the first pinned layer 206 in order to counterbalance the sense current and ferromagnetic coupling fields 226 and 310. It should be noted that the thicknesses of the cobalt based layers 214 and 206 and the cobalt iron hafnium oxide (CoFeHfO) layer 304 shown in FIG. 13 are equivalent magnetic thicknesses of nickel iron ($Ni_{80}Fe_{20}$). The thicknesses of the layers 214, 206 and 304 shown in FIG. 13 would have to be divided by approximately 1.7 to determine the actual thickness thereof. The thickness shown for the nickel iron (NiFe) layer 212 is an actual thickness.

Second Embodiment of the Present Invention

Figure 14:
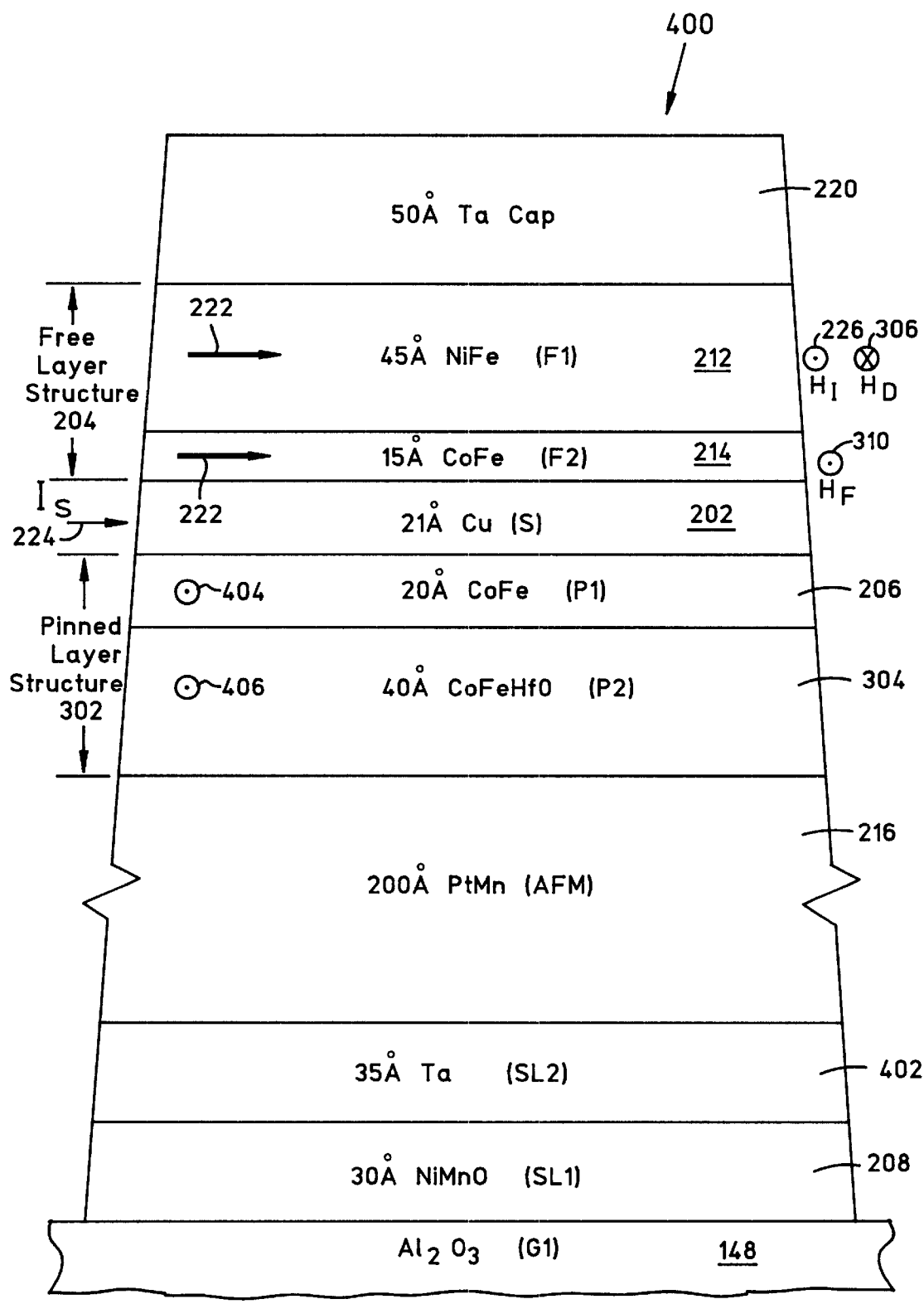
FIG. 14 is an ABS illustration of a second embodiment of the present invention.

A bottom simple pinned spin valve structure 400 is shown in FIG. 14 which is the same as the spin valve sensor 300 shown in FIG. 13 except the pinning layer 216, the second pinned layer 304, the first pinned layer 206, the spacer layer 202, the first free layer 214 and the second free layer 212 have been reversed in their order and a second seed layer (SL2) 402 has been substituted for the second seed layer 210 in FIG. 12. The 35 Å of tantalum (Ta) for the second seed layer 402 provides a better seed layer for the pinning layer 216 than the 10 Å of copper (Cu) in FIG. 13. Because of the difference in the second seed layer 402 there will be a slight change in the sense current field 226. Because of reversal in the order of the layers, magnetic moments 404 and 406 will be directed toward the ABS instead of away from the ABS, as shown by the magnetic moments 308 and 218 in FIG. 13. The spin valve sensor 400 in FIG. 14 has essentially the same advantages as the spin valve sensor 300 in FIG. 13.

Exemplary Bottom AP Pinned Spin Valve

Figure 15:
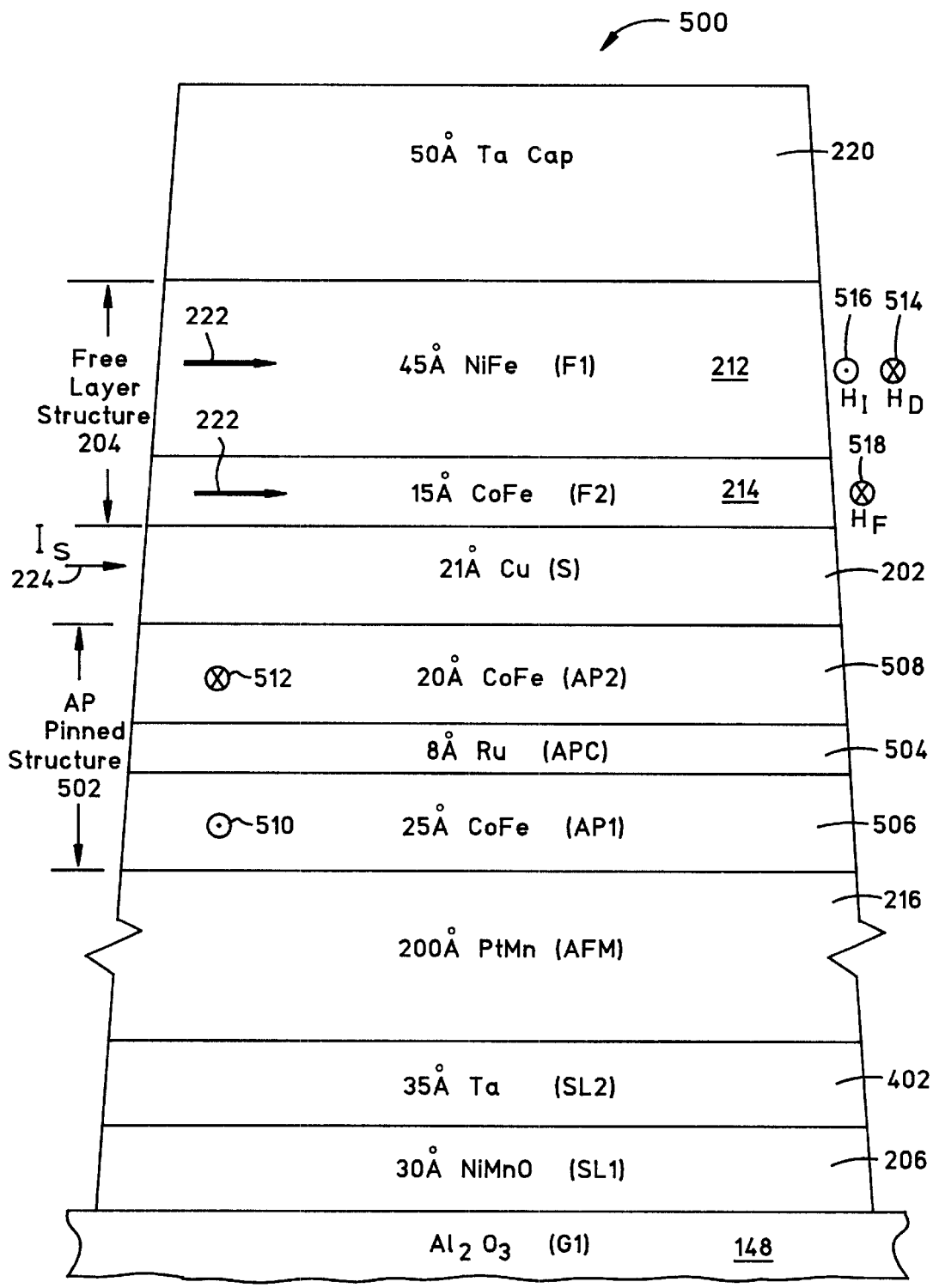
FIG. 15 is an ABS illustration of an exemplary bottom AP pinned spin valve sensor.

A bottom AP pinned spin valve sensor 500 is shown in FIG. 15 which is the same as the spin valve sensor 400 shown in FIG. 14 except an AP pinned structure 502 is substituted for the pinned layer structure 302 in FIG. 14. The AP pinned structure 502 includes an antiparallel coupling (APC) layer 504 which is located between a first AP pinned layer (AP1) 506 and a second AP pinned layer (AP2) 508. Exemplary thicknesses and materials for these layers are 25 Å of cobalt iron (CoFe) for the first AP pinned layer 506, 8 Å of ruthenium (Ru) for the antiparallel coupling layer 504 and 20 Å of cobalt iron (CoFe) for the second AP pinned layer 508. The first AP pinned layer 506 has a magnetic moment 510 which is directed perpendicular to and toward the ABS and the second AP pinned layer 508 has a magnetic moment 512 which is directed perpendicular to and away from the ABS. Since there is flux closure between the first and second AP pinned layers 506 and 508 the AP pinned structure 502 has only 5 Å of an equivalent magnetic moment that is directed toward the ABS and which causes a demagnetization field $H_D$ 514 which is imposed on the free layer structure 204. Accordingly, the demagnetization field 514 is significantly less than the demagnetization field 306 in the embodiments in FIGS. 13 and 14. Further, the extra layers in the AP pinned layer structure 502 provide a sense current field $H_I$ 516 which is greater than the sense current field $H_I$ 226 for the embodiments in FIGS. 13 and 14. Accordingly, the aforementioned biasing problem of the free layer structure 204 is exacerbated more in the AP pinned spin valve sensor than it is in a simple pinned spin valve sensor. This is true even though the ferromagnetic coupling field $H_F$ 518 is antiparallel to the sense current field $H_I$ 516 in the AP pinned spin valve sensor. Consequently, there is a strong felt need for providing a way of decreasing the sense current field 516 due to shunting in the AP pinned spin valve sensor to achieve proper biasing of the free layer structure 204.

Third Embodiment of the Present Invention

Figure 16:
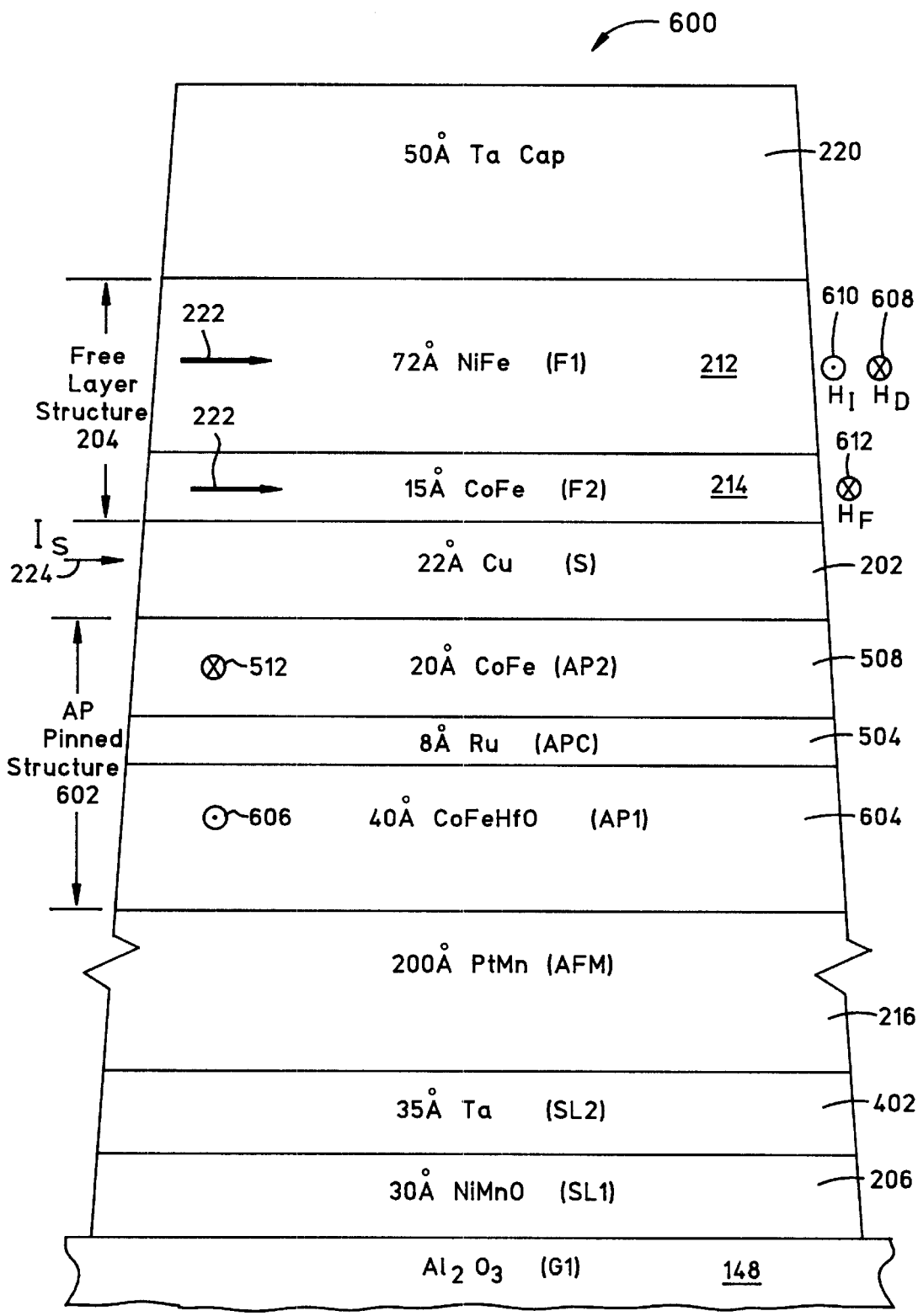
FIG. 16 is an ABS illustration of a third embodiment of the present invention.

The spin valve sensor 600 in FIG. 16 is the same as the spin valve sensor 500 in FIG. 15 except for the AP pinned layer structure 602. The AP pinned layer structure 602 is the same as the AP pinned layer structure 502 in FIG. 15 except the first AP pinned layer 604 is cobalt iron hafnium oxide (CoFeHfO) instead of cobalt iron (CoFe). Proper biasing can be accomplished with a sense current field $H_I$ 610 which is reduced as compared to the sense current field $H_I$ 516 since the first AP pinned layer 604 shunts considerably less sense current 224 than the first AP pinned layer 506 in FIG. 15. The thickness of the first AP pinned layer 604, which is typically thicker than the second AP pinned layer 508, can be designed to completely counterbalance the sense current field 610 and position the magnetic moment 222 of the free layer structure 204 parallel to the ABS at a zero bias point on the transfer curve for the AP pinned spin valve sensor.

Fourth Embodiment of the Invention

Figure 17:
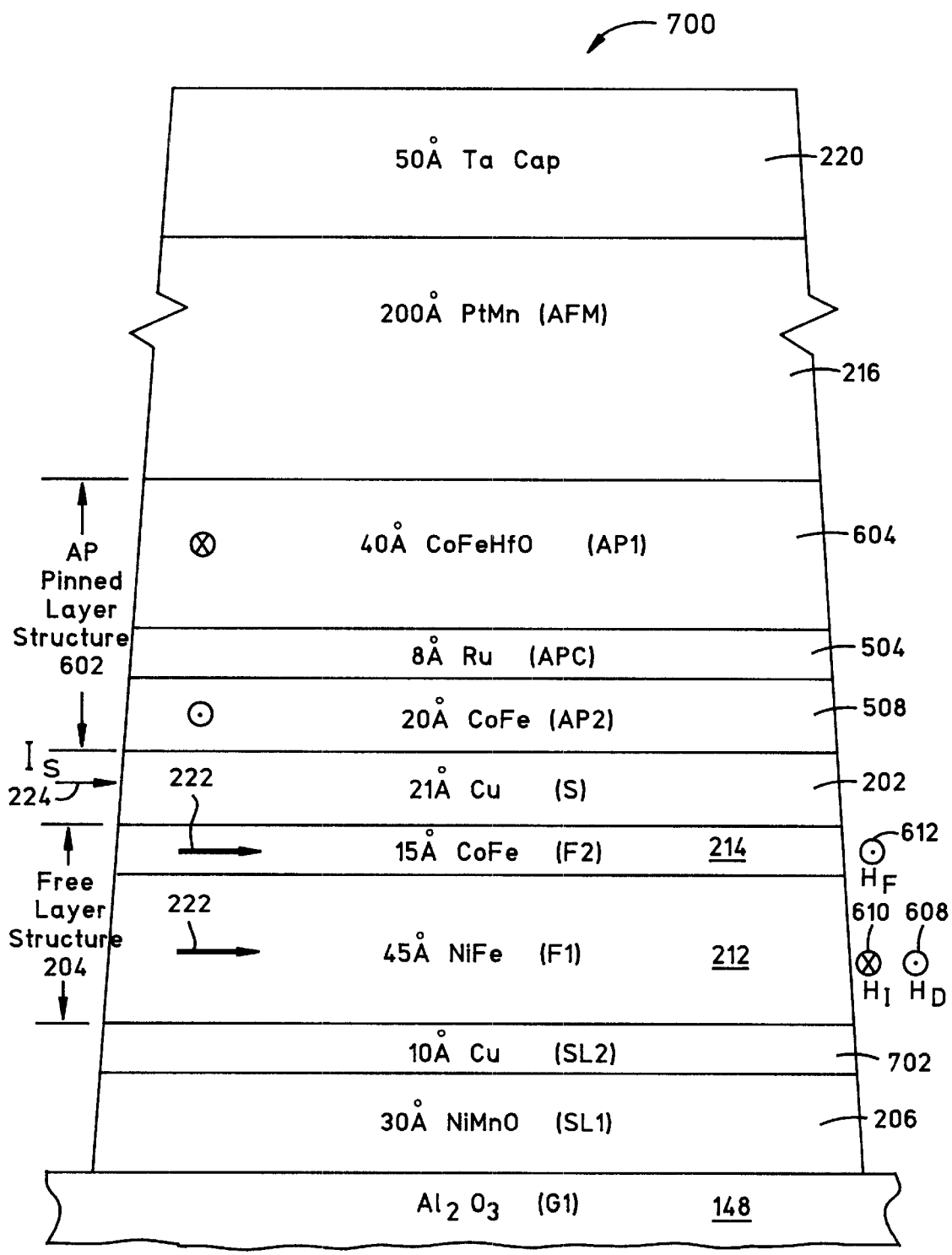
FIG. 17 is an ABS illustration of a fourth embodiment of the present invention.

FIG. 17 shows a top AP pinned spin valve sensor 700 which is the same as the spin valve sensor 600 in FIG. 16 except the layers 216, 604, 504, 508, 202, 214 and 212 are reversed in their order and a copper (Cu) second seed layer 702 is substituted for the second seed layer 402 in FIG. 16 because it promotes a better texture for the free layer structure 204. The magnitudes of the fields 608, 610 and 612 imposed on the free layer structure 204 are essentially the same as the same numbered fields in FIG. 16 except for a slight change in the sense current field 612 due to a substitution of the second seed layer 702. The top AP pinned spin valve sensor 700 in FIG. 17 will have substantially the same advantages as those mentioned for the spin valve sensor 600 in FIG. 16.

Discussion

It should be understood that the various thicknesses given for the various layers are exemplary and can be modified as desired in order to obtain sought for results. Suitable ranges of thicknesses for the layers in the various embodiments of the invention are 10 Å to 50 Å for the first seed layer 208, 5 Å to 20 Å for the copper (Cu) second seed layer 210, 20 Å to 60 Å for the tantalum second seed layer 402, 10 Å to 60 Å for the first free layer 212, 5 Å to 20 Å for the second free layer 214, 15 Å to 30 Å for the spacer layer 202, 5 Å to 20 Å for the pinned layer 206 or second AP pinned layer 508, 100 Å to 300 Å for the platinum manganese (PtMn) pinning layer 216, 20 Å to 100 Å for the cap layer 220 and 30 Å to 60 Å for the cobalt iron hafnium oxide (CoFeHfO) pinned layer 304 or the second AP pinned layer 304.

Clearly, other embodiments and modifications of this invention will occur readily to those of ordinary skill in the art in view of these teachings. Therefore, this invention is to be limited only by following claims, which include all such embodiments and modifications when viewed in conjunction with the above specification and accompanying drawings.

I claim:

1. A magnetic read head comprising:
a spin valve sensor that includes:
a ferromagnetic free layer structure having a magnetic moment that is free to rotate in response to signal fields;
a ferromagnetic pinned layer structure that has a magnetic moment;
a nonmagnetic conductive spacer layer located between the free and pinned layer structures;
an antiferromagnetic pinning layer exchange coupled to the pinned layer for pinning the magnetic moment of the pinned layer;
the ferromagnetic pinned layer structure including at least one layer that is cobalt iron hafnium oxide (CoFeHfO).

2. A magnetic read head as claimed in claim 1 further comprising:
nonmagnetic nonconductive first and second read gap layers;
the spin valve sensor being located between the first and second read gap layers;
ferromagnetic first and second shield layers; and
the first and second read gap layers being located between the first and second shield layers.

3. A magnetic read head as claimed in claim 2 wherein the CoFeHfO is $(Co_{90}Fe_{10})_{100-x}Hf_5O_{10-30}$ where x equals 15 to 35.

4. A magnetic read head as claimed in claim 2 wherein the pinned layer structure is closer to the first read gap layer than to the second read gap layer.

5. A magnetic read head as claimed in claim 2 wherein the pinned layer structure is closer to the second read gap layer than the first read gap layer.

6. A magnetic read head as claimed in claim 2 including:
said at least pinned layer structure including first and second pinned layers;
the first pinned layer being said at least one layer that is cobalt iron hafnium oxide (CoFeHfO) and the second pinned layer being a cobalt based layer; and
the second pinned layer interfacing the spacer layer.

7. A magnetic read head as claimed in claim 6 wherein the second pinned layer is cobalt iron (CoFe).

8. A magnetic read head as claimed in claim 7 wherein the first pinned layer has an equivalent magnetic thickness that is greater than an equivalent magnetic thickness of the second pinned layer.

9. A magnetic read head as claimed in claim 8 wherein the CoFeHfO is $(Cog_{90}Fe_{10})_{100-x}Hf_5O_{10-30}$ where x equals 15 to 35.

10. A magnetic read head as claimed in claim 9 wherein the pinned layer structure is closer to the first read gap layer than to the second read gap layer.

11. A magnetic read head as claimed in claim 9 wherein the pinned layer structure is closer to the second read gap layer than the first read gap layer.

12. A magnetic read head as claimed in claim 2 wherein the pinned layer structure is an antiparallel (AP) pinned layer structure that includes:
ferromagnetic first and second AP pinned layers;
an AP coupling layer located between the first and second AP pinned layers;
the first AP pinned layer being said at least one layer that is cobalt iron hafnium oxide (CoFeHfO) and the second AP pinned layer being cobalt based; and
the second layer interfacing the spacer layer.

13. A magnetic read head as claimed in claim 12 wherein the second AP pinned layer is cobalt iron (CoFe).

14. A magnetic read head as claimed in claim 13 wherein the first AP pinned layer has an equivalent magnetic thickness that is greater than an equivalent magnetic thickness of the second AP pinned layer.

15. A magnetic read head as claimed in claim 14 wherein the CoFeHfO is $(Co_{90}Fe_{10})_{100-x}Hf_5O_{10-30}$ where x equals 15 to 35.

16. A magnetic read head as claimed in claim 15 wherein the pinned layer structure is closer to the first read gap layer than to the second read gap layer.

17. A magnetic read head as claimed in claim 15 wherein the pinned layer structure is closer to the second read gap layer than the first read gap layer.

18. A magnetic head assembly having a read head and a write head comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a spin valve sensor;
nonmagnetic nonconductive first and second read gap layers;
the spin valve sensor being located between the first and second read gap layers;
a ferromagnetic first shield layer; and
the first and second read gap layers being located between the first shield layer and the first pole piece layer; and
the spin valve sensor including:
a ferromagnetic free layer structure having a magnetic moment that is free to rotate in response to signal fields;
a ferromagnetic pinned layer structure that has a magnetic moment;
a nonmagnetic conductive spacer layer located between the free and pinned layer structures;
an antiferromagnetic pinning layer exchange coupled to the pinned layer for pinning the magnetic moment of the pinned layer; and
the ferromagnetic pinned layer structure including at least one layer that is cobalt iron hafnium oxide (CoFeHfO).

19. A magnetic head assembly as claimed in claim 18 wherein the read head further includes:
a ferromagnetic second shield layer;
a nonmagnetic separation layer; and
the separation layer being located between the second shield layer the first pole piece layer.

20. A magnetic head assembly as claimed in claim 18 wherein the CoFeHfO is $(Co_{90}Fe_{10})_{100-x}Hf_5O_{10-30}$ where x equals 15 to 35.

21. A magnetic head assembly as claimed in claim 18 including:
said at least pinned layer structure including first and second pinned layers;
the first pinned layer being said at least one layer that is cobalt iron hafnium oxide (CoFeHfO) and the second pinned layer being a cobalt based layer; and
the second pinned layer interfacing the spacer layer.

22. A magnetic head assembly as claimed in claim 21 wherein the second pinned layer is cobalt iron (CoFe).

23. A magnetic head assembly as claimed in claim 22 wherein the first pinned layer has an equivalent magnetic thickness that is greater than an equivalent magnetic thickness of the second pinned layer.

24. A magnetic head assembly as claimed in claim 23 wherein the CoFeHfO is $(Co_{90} Fe_{10})_{100-x} Hf_5 O_{10-30}$ where x equals 15 to 35.

25. A magnetic head assembly as claimed in claim 18 wherein the pinned layer structure is an antiparallel (AP) pinned layer structure that includes:
   ferromagnetic first and second AP pinned layers;
   an AP coupling layer located between the first and second AP pinned layers;
   the first AP pinned layer being said at least one layer that is cobalt iron hafnium oxide (CoFeHfO) and the second AP pinned layer being cobalt based; and
   the second layer interfacing the spacer layer.

26. A magnetic head assembly as claimed in claim 25 wherein the second AP pinned layer is cobalt iron (CoFe).

27. A magnetic head assembly as claimed in claim 26 wherein the first AP pinned layer has an equivalent magnetic thickness that is greater than an equivalent magnetic thickness of the second AP pinned layer.

28. A magnetic head assembly as claimed in claim 27 wherein the CoFeHfO is $(Co_{90} Fe_{10})_{100-x} Hf_5 O_{10-30}$ where x equals 15 to 35.

29. A magnetic disk drive having at least one slider that has an air bearing surface (ABS), the slider supporting at least one magnetic head assembly that includes a read head and a write head, the disk drive comprising:
   the write head including:
      ferromagnetic first and second pole piece layers;
      each of the first and second pole piece layers having a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   the read head including:
      a spin valve sensor;
      nonmagnetic nonconductive first and second read gap layers;
      the spin valve sensor being located between the first and second read gap layers;
      a ferromagnetic first shield layer; and
      the first and second read gap layers being located between the first shield layer and the first pole piece layer; and
   the spin valve sensor including:
      a ferromagnetic free layer structure having a magnetic moment that is free to rotate in response to signal fields;
      a ferromagnetic pinned layer structure that has a magnetic moment;
      nonmagnetic conductive spacer layer located between the free and pinned layer structures;
      an antiferromagnetic pinning layer exchange coupled to the pinned layer for pinning the magnetic moment of the pinned layer; and
      the ferromagnetic pinned layer structure including at least one layer that is cobalt iron hafnium oxide (CoFeHfO); and a housing;
   a magnetic disk rotatably supported in the housing;
   a support mounted in the housing for supporting the magnetic head assembly with its ABS facing the magnetic disk so that the magnetic head assembly is in a transducing relationship with the magnetic disk;
   a spindle motor for rotating the magnetic disk;
   an actuator connected to the support for moving the magnetic head assembly to multiple positions with respect to said magnetic disk; and
   a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

30. A magnetic disk drive as claimed in claim 29 wherein the read head further includes:
   a ferromagnetic second shield layer;
   a nonmagnetic separation layer; and
   the separation layer being located between the second shield layer the first pole piece layer.

31. A magnetic disk drive as claimed in claim 29 including:
   said at least pinned layer structure including first and second pinned layers;
   the first pinned layer being said at least one layer that is cobalt iron hafnium oxide (CoFeHfO) and the second pinned layer being a cobalt based layer; and
   the second pinned layer interfacing the spacer layer.

32. A magnetic disk drive as claimed in claim 31 wherein the second pinned layer is cobalt iron (CoFe).

33. A magnetic disk drive as claimed in claim 32 wherein the first pinned layer has an equivalent magnetic thickness that is greater than an equivalent magnetic thickness of the second pinned layer.

34. A magnetic disk drive as claimed in claim 33 wherein the CoFeHfO is $(Co_{90} Fe_{10})_{100-x} Hf_5 O_{10-30}$ where x equals 15 to 35.

35. A magnetic disk drive as claimed in claim 29 wherein the pinned layer structure is an antiparallel (AP) pinned layer structure that includes:
   ferromagnetic first and second AP pinned layers;
   an AP coupling layer located between the first and second AP pinned layers;
   the first AP pinned layer being said at least one layer that is cobalt iron hafnium oxide (CoFeHfO) and the second AP pinned layer being cobalt based; and
   the second layer interfacing the spacer layer.

36. A magnetic disk drive as claimed in claim 35 wherein the second AP pinned layer is cobalt iron (CoFe).

37. A magnetic disk drive as claimed in claim 36 wherein the first AP pinned layer has an equivalent magnetic thickness that is greater than an equivalent magnetic thickness of the second AP pinned layer.

38. A magnetic disk drive as claimed in claim 37 wherein the CoFeHfO is $(Co_{90} Fe_{10})_{100-x} Hf_5 O_{10-30}$ where x equals 15 to 35.

39. A method of making a read head that includes a spin valve sensor comprising the steps of:
   a making of the spin valve sensor comprising the steps of:
      forming a ferromagnetic free layer structure having a magnetic moment that is free to rotate in response to signal fields;
      forming a ferromagnetic pinned layer structure that has a magnetic moment;

forming a nonmagnetic conductive spacer layer between the free and pinned layer structures;

forming an antiferromagnetic pinning layer exchange coupled to the pinned layer for pinning the magnetic moment of the pinned layer; and forming the ferromagnetic pinned layer structure with at least one layer that is cobalt iron hafnium oxide (CoFeHfO).

40. A method as claimed in claim 39 further comprising the steps of:

forming nonmagnetic nonconductive first and second read gap layers with the spin valve sensor located therebetween; and forming ferromagnetic first and second shield layers with the first and second read gap layers located therebetween.

41. A method as claimed in claim 40 including:

forming said at least pinned layer structure with first and second pinned layers;

forming the first pinned layer as said at one layer that is cobalt iron hafnium oxide (CoFeHfO) and forming the second pinned layer of a cobalt based material; and locating the second pinned layer interfacing the spacer layer.

42. A method as claimed in claim 41 wherein the second pinned layer is formed of cobalt iron (CoFe).

43. A method as claimed in claim 42 wherein the first pinned layer is formed with an equivalent magnetic thickness that is greater than an equivalent magnetic thickness of the second pinned layer.

44. A method as claimed in claim 43 wherein the CoFeHfO layer is formed of $(Co_{90} Fe_{10})_{100-x} Hf_5 O_{10-30}$ where x equals 15 to 35.

45. A method as claimed in claim 40 wherein the pinned layer structure is an antiparallel (AP) pinned layer structure that is made comprising the steps of:

forming ferromagnetic first and second AP pinned layers;

forming an AP coupling layer located between the first and second AP pinned layers;

forming the first AP pinned layer as said at least one layer that is cobalt iron hafnium oxide (CoFeHfO) and forming the second layer of a cobalt based material; and locating the second layer interfacing the spacer layer.

46. A method as claimed in claim 45 wherein the second AP pinned layer is cobalt iron (CoFe).

47. A method as claimed in claim 46 wherein the first AP pinned layer is formed with an equivalent magnetic thickness that is greater than an equivalent magnetic thickness of the second AP pinned layer.

48. A method as claimed in claim 47 wherein the CoFeHfO layer is formed of $(Co_{90} Fe_{10})_{100-x} H_5 O_{10-30}$ where x equals 15 to 35.

49. A method of making a magnetic head assembly having a read head and a write head comprising the steps of:

a forming of the write head comprising the steps of:

forming ferromagnetic first and second pole piece layers with a yoke portion between a pole tip portion and a back gap portion;

forming a nonmagnetic write gap layer between the pole tip portions of the first and second pole piece layers;

forming an insulation stack with at least one coil layer embedded therein in the yoke portions of the first and second pole piece layers; and connecting the first and second pole piece layers at their back gaps portions; and a forming of the read head comprising the steps of::

forming nonmagnetic nonconductive first and second read gap layers;

forming a spin valve sensor between the first and second read gap layers;

forming a ferromagnetic first shield layer; and forming the first and second read gap layers between the first shield layer and the first pole piece layer; and a making of the spin valve sensor comprising the steps of:

forming a ferromagnetic free layer structure having a magnetic moment that is free to rotate in response to signal fields;

forming a ferromagnetic pinned layer structure that has a magnetic moment;

forming a nonmagnetic conductive spacer layer between the free and pinned layer structures;

forming an antiferromagnetic pinning layer exchange coupled to the pinned layer for pinning the magnetic moment of the pinned layer; and forming the ferromagnetic pinned layer structure with at least one layer that is cobalt iron hafnium oxide (CoFeHfO).

50. A method as claimed in claim 49 further comprising the steps of:

forming a ferromagnetic second shield layer between the second read gap layer and the first pole piece layer; and forming a nonmagnetic separation layer between the second shield layer the first pole piece layer.

51. A method as claimed in claim 49 including:

forming said at least pinned layer structure with first and second pinned layers;

forming the first pinned layer as said at one layer that is cobalt iron hafnium oxide (CoFeHfO) and forming the second pinned layer of a cobalt based material; and locating the second pinned layer interfacing the spacer layer.

52. A method as claimed in claim 51 wherein the second pinned layer is formed of cobalt iron (CoFe).

53. A method as claimed in claim 52 wherein the first pinned layer is formed with an equivalent magnetic thickness that is greater than an equivalent magnetic thickness of the second pinned layer.

54. A method as claimed in claim 53 wherein the CoFeHfO layer is formed of $(Co_{90} Fe_{10})_{100-x} Hf_5 O_{10-30}$ where x equals 15 to 35.

55. A method as claimed in claim 49 wherein the pinned layer structure is an antiparallel (AP) pinned layer structure that is made comprising the steps of:

forming ferromagnetic first and second AP pinned layers;

forming an AP coupling layer located between the first and second AP pinned layers;

forming the first AP pinned layer as said at least one layer that is cobalt iron hafnium oxide (CoFeHfO) and forming the second layer of a cobalt based material; and locating the second layer interfacing the spacer layer.

56. A method as claimed in claim 55 wherein the second AP pinned layer is cobalt iron (CoFe).

57. A method as claimed in claim 56 wherein the first AP pinned layer is formed with an equivalent magnetic thickness that is greater than an equivalent magnetic thickness of the second AP pinned layer.

58. A method as claimed in claim 57 wherein the CoFeHfO layer is formed of $(Co_{90} Fe_{10})_{100-x} Hf_5 O_{10-30}$ where x equals 15 to 35.

* * * * *